United States Patent
Alfier et al.

(10) Patent No.: US 10,264,656 B2
(45) Date of Patent: Apr. 16, 2019

(54) METHOD OF CONTROLLING LIGHTING SOURCES, CORRESPONDING SYSTEM AND COMPUTER PROGRAM PRODUCT

(71) Applicants: OSRAM GmbH, Munich (DE); CLAY PAKY S.p.A., Seriate (IT)

(72) Inventors: Alberto Alfier, Vedelago (IT); Simone Capeleto, Padua (IT); Giovanni Zucchinali, Seriate (IT); Andrea Morra, Padua (IT)

(73) Assignees: OSRAM GMBH, Munich (DE); CLAY PAKY S.P.A., Seriate (IT)

( * ) Notice: Subject to any disclaimer, the term of this patent is extended or adjusted under 35 U.S.C. 154(b) by 0 days.

(21) Appl. No.: 15/684,983

(22) Filed: Aug. 24, 2017

(65) Prior Publication Data
US 2018/0063926 A1 Mar. 1, 2018

(30) Foreign Application Priority Data
Aug. 24, 2016 (IT) ........................ 102016000086859

(51) Int. Cl.
*H05B 37/02* (2006.01)
*G01J 1/42* (2006.01)
*G06F 17/30* (2006.01)

(52) U.S. Cl.
CPC ........ *H05B 37/0245* (2013.01); *G01J 1/4204* (2013.01); *G01J 1/4228* (2013.01);
(Continued)

(58) Field of Classification Search
None
See application file for complete search history.

(56) References Cited

U.S. PATENT DOCUMENTS 6,675,148 B2 * 1/2004 Hardwick ........... G10L 19/0204
704/500
8,878,991 B2 * 11/2014 Cook ................... H05B 37/029
348/460

(Continued)

FOREIGN PATENT DOCUMENTS

EP 2851894 A1 3/2015

OTHER PUBLICATIONS

Italian Search Report based on application No. 201600086859 (8 pages) dated May 10, 2017 (Reference Purpose Only).

*Primary Examiner* — Douglas W Owens
*Assistant Examiner* — Srinivas Sathiraju
(74) *Attorney, Agent, or Firm* — Viering Jentschura & Partner MBB

(57) ABSTRACT

According to the present disclosure, lighting sources, having operating parameter(s) which is controllable in lighting sequence(s) as a function of a time code data set coupled with the sequence, are controlled: by providing a repository of operating data files for the lighting sources coupled with lighting sources, with each data file including time code data set(s) for lighting sequence(s) for one of the lighting sources, by detecting ambient lighting level signal(s) at the ambient where the lighting sources are located, by retrieving in the data repository operating data file(s) coupled with a selected one of the lighting sources, and by operating the selected lighting source by controlling the operating parameter(s) as a function of the operating data included in the operating data file retrieved and as a function of the ambient lighting level signal.

9 Claims, 1 Drawing Sheet

(52) U.S. Cl.
CPC ..... *G06F 17/30286* (2013.01); *H05B 37/029* (2013.01); *H05B 37/0218* (2013.01); *H05B 37/0236* (2013.01); *H05B 37/0281* (2013.01)

(56) References Cited

U.S. PATENT DOCUMENTS

| | | | | |
|---|---|---|---|---|
| 9,094,615 | B2 * | 7/2015 | Aman | G01S 3/7864 |
| 9,253,527 | B2 * | 2/2016 | Hall | H04N 21/4316 |
| 9,286,726 | B2 * | 3/2016 | Balram | G06F 3/011 |
| 9,311,753 | B2 * | 4/2016 | Wilkinson | H04N 5/272 |
| 9,432,612 | B2 * | 8/2016 | Bruhn | H04N 7/106 |
| 9,436,076 | B2 * | 9/2016 | Kim | E04H 3/22 |
| 9,555,310 | B2 * | 1/2017 | Aman | A63B 71/0669 |
| 9,560,307 | B2 * | 1/2017 | Rivera | G03B 21/00 |
| 9,600,936 | B2 * | 3/2017 | Boivin | H04N 5/272 |
| 9,805,272 | B1 * | 10/2017 | Chen | G06K 9/00751 |
| 9,888,337 | B1 * | 2/2018 | Zalewski | H04W 4/70 |
| 2011/0175925 | A1 * | 7/2011 | Kane | G01J 1/42 |
| | | | | 345/589 |
| 2015/0297949 | A1 * | 10/2015 | Aman | G06T 7/246 |
| | | | | 348/157 |
| 2018/0063923 | A1 * | 3/2018 | Alfier | H05B 37/0281 |
| 2018/0063926 | A1 * | 3/2018 | Alfier | H05B 37/0245 |

* cited by examiner

METHOD OF CONTROLLING LIGHTING SOURCES, CORRESPONDING SYSTEM AND COMPUTER PROGRAM PRODUCT

CROSS-REFERENCE TO RELATED APPLICATION

This application claims priority to Italian Patent Application Serial No. 102016000086859, which was filed Aug. 24, 2016, and is incorporated herein by reference in its entirety.

TECHNICAL FIELD

The present description relates to lighting sources.

One or more embodiments may find application in various contexts, both on a professional and on a non-professional level.

BACKGROUND

Light fixtures for professional applications (e.g. in the show business, such as theatres, cinemas, stages or discotheques) and for semi-professional applications (e.g. hotels, restaurants, meeting rooms), as well as for some non-professional environments (e.g. household or small meeting places) may impose specific needs which are not found in more common situations.

In such contexts, it may be desirable to fully take advantage of the potentialities of the lighting sources in ways different from current applications. For example, it may be desirable to modify the lighting features during a show, by acting on parameters such as light colour, light directionality, light distribution, light brightness etc. Such an ability to modify lighting parameters may be of interest also for household applications, e.g. listening to music, watching a TV program or film, for web applications and e.g. for on-line videogames.

In current applications, when it is impossible or undesirable to resort to a wholly human control, audio sensors may be employed which are adapted to detect some characteristics of an audio program being broadcast (e.g. by sensing the bass sounds of drums), by associating such detection to specific interventions on the lighting sources. This solution suffers from intrinsic limitations, both as regards the possible light combinations and as regards a possible creative/artistic usage of the lighting sources: an example may be the possibility of matching lighting in a given environment with a specific musical program/film/event and the flexible usage of lighting sources by the end user.

SUMMARY

One or more embodiments aim at overcoming the previously described drawbacks.

According to one or more embodiments, said object may be achieved thanks to a method having the features specifically set forth in the claims that follow.

One or more embodiments may also concern a corresponding system, as well as a corresponding computer program product adapted to be loaded in the memory of at least one processing device, and including software code portions to execute the processing steps when the program is run on at least one computer.

As used herein, the reference to such a computer program product corresponds to the reference to computer-readable media, which contain instructions to control the processing system in order to coordinate the implementation of the method according to the present disclosure.

The reference to "at least one processing device" highlights the possibility of implementing one or more embodiments in a modular and/or distributed arrangement.

The claims are an integral part of the technical teaching provided herein with reference to the embodiments.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figure 1:
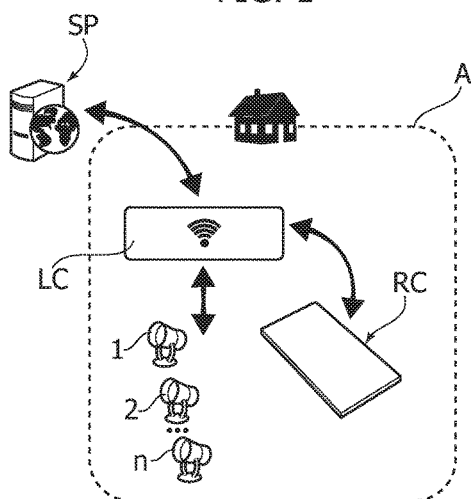
FIG. 1 is a first possible functional block diagram of a system according to one or more embodiments.

In the following description, various specific details are given to provide a thorough understanding of various exemplary embodiments. The embodiments may be practiced without one or several specific details, or with other methods, components, materials, etc. In other instances, well-known structures, materials, and operations are not shown or described in detail to avoid obscuring various aspects of the embodiments.

Reference throughout this specification to "one embodiment" or "an embodiment" means that a particular feature, structure, or characteristic described in connection with the embodiment is included in at least one embodiment. Thus, the possible appearances of the phrases "in one embodiment" or "in an embodiment" in various places throughout this specification are not necessarily all referring to the same embodiment. Furthermore, particular features, structures, or characteristics may be combined in any suitable manner in one or more embodiments.

The headings provided herein are for convenience only, and therefore do not interpret the extent of protection or scope of the embodiments.

Part of the following detailed description reproduces the detailed description of the Italian Patent Application 102016000024679 of 9 Mar. 2016.

In the Figures, references 1, 2, . . . , n denote a certain number of lighting fixtures, which may be the same or different from each other, and which may be installed in one or more environments, such as a general ambient A.

As used herein, the term "ambient" is to be construed in its broadest meaning, being adapted to include either a venue for shows and/or events (e.g. a theatre, a cinema, a stage, a discotheque, a sport facility etc.) or a public space (e.g. a hotel, a restaurant, a meeting room), or a home environment adapted to be lighted by sources 1, 2, . . . , n, which may be present in any number.

In one or more embodiments, the light radiation sources may be implemented with different technologies.

Moreover, it will be assumed herein that said lighting sources have at least one selectively controllable operating parameter.

Said operating parameter may be chosen in a very wide range: it may be e.g. the level of light brightness (which is controllable in on/off switching but also for a selective adjustment of intensity, so-called "dimming"), or the colour of the emitted light radiation, the orientation (both static, so-called "tilt", or dynamic, e.g. as regards the speed, the width or the path of a panoramic movement), the focus, the zoom (panoramic or spotlight) and so on: as a possible non-limiting reference, it is possible to take into account all the parameters which may be modified in order to implement lighting effects, optionally in combination with other effects (e.g. coloured smoke).

Light radiation sources having such option of selectively controlling at least one lighting parameter are known in the art, which makes it unnecessary to provide a more detailed description herein.

This also regards the possibility of controlling such parameters according to one or more lighting sequence, according to a time code data set adapted to identify, e.g., when a certain parameter of the light radiation source is to be modified. As a simple example (the idea being adapted to be transferred to any parameter regulating the operation of a lighting source) we may mention an on/off switching sequence of the source at given times, which identify the moments when the light radiation source is turned on or off.

Therefore, for each light radiation source 1, 2, . . . , n, it is possible to identify at least one operating parameter which may be controlled according to at least one lighting sequence, on the basis of a certain time code data set. Such control action may be exerted via a control device—known in itself—which will be named local controller LC in the following. The term "local" refers to the fact that such a controller may act locally (i.e. in ambient A), in order to control the light radiation sources 1, 2, . . . , n correspondingly.

This may take place specifically via a computer program product (i.e. via software) offering the ability, via controller LC, to identify each single source 1, 2, . . . , n and to act on the respective operating parameters, according to software instructions adapted to be defined by the user during calibration.

For example, in one or more embodiments, the user may calibrate certain functions, e.g. according to the installation of the devices in ambient A.

In one or more embodiments, such a calibration (i.e. a preparatory definition of the parameters which may be controlled, and of the way they may be controlled, for each source 1, 2, . . . , n) may also be carried out by the end user, via a remote controller RC which will be better detailed in the following.

In one or more embodiments, the software instructions may not be exactly defined at the beginning, the "free parameters" (undefined parameters) thereof being adapted to be set during calibration.

One or more embodiments may envisage providing, e.g. at a server SP (adapted to be located remotely from ambient A, although such a solution is not mandatory), a repository of operating data of sources 1, 2, . . . , n.

In one or more embodiments, the files of such operating data may be organized in Data Packages (DPs) which are coupled, i.e. associated, to lighting sources 1, 2, . . . , n, in such a way that each data file DP may comprise at least one time code data set for at least one lighting sequence of a respective lighting source 1, 2, . . . , n.

The following Table exemplifies a possible organization of such Data Packages:

| Source No. | Lighting Sequence | Time Code Data Set |
|---|---|---|
| 1 | S11 | $t_{S11,1}, t_{S11,2}, \ldots, t_{S11,k}$ |
| 1 | S12 | $t_{S12,1}, t_{S12,2}, \ldots, t_{S12,l}$ |
| 2 | S21 | $t_{S21,1}, t_{S21,2}, \ldots, t_{S21,w}$ |
| 3 | S31 | $t_{S31,1}, t_{S31,2}, \ldots, t_{S31,u}$ |
| 3 | S32 | $t_{S32,1}, t_{S32,2}, \ldots, t_{S32,z}$ |
| 3 | S33 | $t_{S33,1}, t_{S33,2}, \ldots, t_{S33,m}$ |
| 3 | S34 | $t_{S34,1}, t_{S34,2}, \ldots, t_{S34,n}$ |
| . . . | . . . | . . . |
| N | Sn1 | $t_{Sn1,1}, t_{Sn1,2}, \ldots, t_{Sn1,v}$ |

In this table, Sij denotes the j-th sequence available for the i-th source, with the association of a respective time code data set $t_{Sij,1}, t_{Sij,2}, \ldots$.

As a deliberately simplified example, each sequence may be considered as simply identifying a sequence of on/off switching which must take place at the identified times of the related time code data $t_{Sij,1}, t_{Sij,2}, \ldots$.

In one or more embodiments, as exemplified in the Figures, server SP may be located remotely from ambient A, and may be configured to communicate remotely with controller LC, with the ability of exchanging said Data Packages along a connection, e.g. a web connection such as the Internet.

Figure 2:
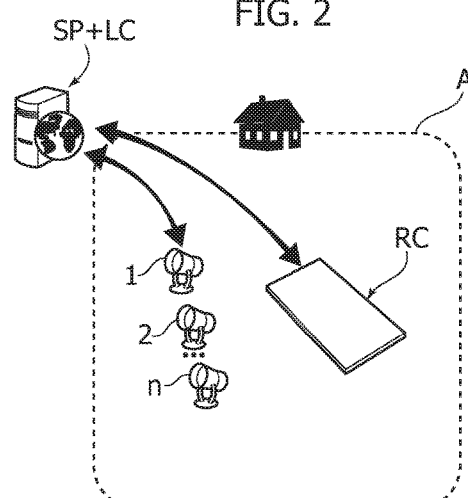
FIG. 2 is a second possible functional block diagram of a system according to one or more embodiments.
Figure 3:
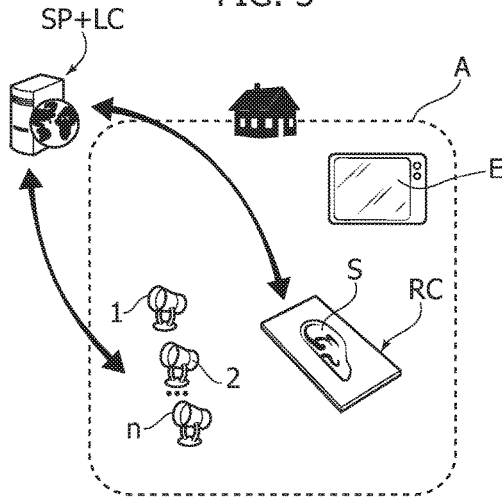
FIG. 3 is a third possible functional block diagram of a system according to one or more embodiments.

In one or more embodiments as exemplified in FIGS. 2 and 3, controller LC may be practically embedded in server SP, while keeping the role of "local" controller as defined in the foregoing.

Moreover, the ability is preserved to interact with sources 1, 2, . . . , n, so as to control the operating parameters thereof and/or to interact with remote controller RC, which may host the calibration software mentioned in the foregoing.

As regards the connection and the interaction between server SP, local controller LC and remote controller RC, different solutions may be resorted to as exemplified in the Figures.

Figure 4:
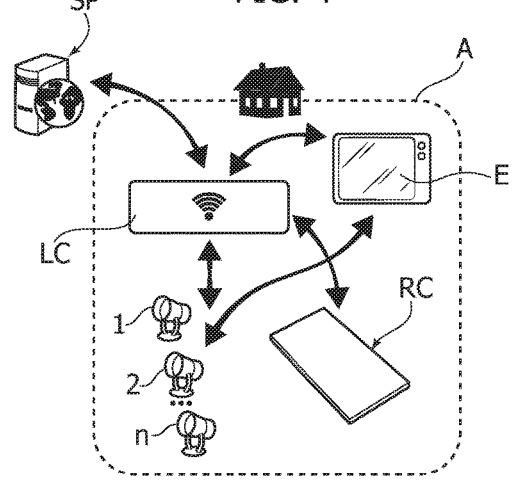
FIG. 4 is a fourth possible functional block diagram of a system according to one or more embodiments.

For example, FIGS. 1 and 4 refer to possible solutions wherein controller LC performs the role of a node, to which server SP, remote controller RC and sources 1, 2, . . . , n are connected.

On the other hand, FIGS. 2 and 3 exemplify solutions wherein, as controller LC is embedded in server SP, the assembly including server SP and controller LC is connected both with remote controller RC and with sources 1, 2, . . . , n.

As regards the specific implementations, the connections may be either wired or wireless, comprising either standard or specific data transmission protocols.

In one or more embodiments, controller LC and remote controller RC may be embedded in one device such as a smartphone, a smart TV set, specific devices such as a Set Top Box, or in a computer.

Moreover, in one or more embodiments the physical interaction with server SP may be limited to one of controller LC or remote controller RC; in this case, the component which is not connected to server SP (e.g. controller LC, or respectively remote controller RC) uses the connected device (i.e. remote controller RC or, respectively, controller LC) for transferring data towards server SP.

In embodiments as exemplified in FIGS. 2 and 3, lighting sources 1, 2, . . . , n may be connected directly to server SP, the functions of controller LC being practically embedded in server SP.

In such a case, remote controller RC may connect directly to server SP, e.g. via standard functions similar to those used on a smartphone or a tablet.

In one or more embodiments, local controller LC implements the communication of server SP with the fixtures 1, 2, . . . , n and with remote controller RC.

In one or more embodiments, as exemplified in FIGS. 2 and 3, the fixtures and the remote controller may be connected directly to the SP, without the need of a local controller LC as a separate entity. One example is a remote controller RC implemented as a smartphone, the sources comprising an IP address and a router.

In this case, the function of controller LC is practically "embedded", i.e. it is performed by such other entities.

It will be understood, therefore, that the reference to three separate entities, i.e. local controller LC, server SP and remote control RC is here merely functional and does not assume, even implicitly, the provision of such components as physically separated entities.

For example, in one or more embodiments as exemplified in FIGS. 2 and 3, the function of local controller LC which in FIGS. 1 and 4 is shown as performed by a discrete entity may be carried out directly by server SP.

Moreover, in one or more embodiments, the function of the local controller LC may serve to control a certain source or fixture 1, 2, . . . , n by forwarding a lighting sequence to such fixture once it has been obtained by the SP.

In one or more embodiments, server SP may contain a data repository (i.e. a database) comprising data files or Data Packages which may be selected e.g. by the end user via remote controller RC.

As described in the foregoing, in one or more embodiments each Data Package may include (at least):
one or more lighting sequences compatible with sources 1, 2, . . . , n installed in ambient A, and
one or more time code data sets associated, in server SP, to the lighting sequences.

In one or more embodiments (by acting e.g. on remote controller RC) the user may therefore select a given lighting sequence for a given source 1, 2, . . . , n, thus originating the retrieval, within the repository of server SP, of at least one Data Package coupled to the selected lighting source.

The thus identified Data Package may therefore be used to control the light radiation sources 1, 2, . . . , n according to the selected Data Package, i.e. by operating (each) selected light radiation source through the selective control of at least one operating parameter thereof, according to the operating data contained in the operating data file (Data Package) retrieved from the repository.

A system as exemplified herein may be used according to a wide range of possibilities.

For example, while he is following a given audio/video event (e.g. while he is watching a TV show or a film, while he is listening to a concert, etc.), the user may establish (e.g. via remote controller RC) a connection to server SP, and select one or more given lighting sequences which he wants to apply onto lighting sources 1, 2, . . . , n located in the ambient A where he is at the moment.

Such a selection may be achieved, e.g., in the repository present in server SP, from a list of events which has previously been stored in server SP.

At this point, a lighting sequence which has been selected for a given source (more precisely, the Data Package associated thereto) may be used to operate that source according to that sequence, specifically as regards the time code data set.

In one or more embodiments, the related time code data set may enable synchronising the lighting sequence with the audio/video event on the basis of the user's request.

It will be appreciated that what has been said in the foregoing with reference to one source may be applied, even simultaneously, to two or more sources 1, 2, . . . , n.

For this purpose, one or more embodiments may take advantage of the fact that the configuration parameters of sources 1, 2, . . . , n may be standardized, being e.g. based on the same definition of parameters, thus enabling e.g. the definition of a standardized language linked to the operating parameters of the light radiation sources of a given manufacturer (who may know or own the control configuration).

For example, in one or more embodiments, the Data Packages collected in the repository of server SP may correspond to lighting sequences associated to specific events (e.g. given films, songs, shows), created and stored in the repository by:
either professional or amateur lighting directors,
producers of music/video software,
event organizers,
producers, developers and distributors of the lighting sources.

In one or more embodiments, said Data Packages may be generated by the end user and then may be loaded into server SP by taking advantage of the existing connection with remote controller RC (optionally through controller LC), so as to confer the end user the role of an amateur lighting director.

In this regard, in one or more embodiments, a given lighting sequence may be stored in the sources 1, 2, . . . , n, e.g. as a pre-programmed function according to a basic operation.

As previously stated, the synchronization (phasing) of the lighting sequences of the repository of server SP may be achieved through the time code data sets associated to such sequences, which are implemented e.g. via a standard communication language which may be used by a broadcast source (web radio, web tv, web music).

In one or more embodiments, such a synchronising mechanism may involve the intervention of adaptive mechanisms.

Such mechanisms may be either open-loop or closed-loop mechanisms.

The first option may comprise, e.g., an (accurate) estimate and compensation of the possible delays between the audio/video program and the signals regulating the application of the lighting sequence, which may optionally be improved e.g. by "ping" tests.

In the second instance it is possible to use, as a loop control signal, an ambient audio/video signal which corresponds to the broadcast program, e.g. via a TV set or monitor E or a similar device installed in ambient A (see FIGS. 3 and 4).

Such an "ambient" signal may be obtained via sensors (e.g. via an audio/video sensor S such a microphone associated with remote controller RC—which, as previously stated, may also be implemented via a smartphone, see FIG. 3) or via a direct connection e.g. to said device E (see FIG. 4).

However it may be obtained, said "ambient" audio and/or video signal may be used either directly or after further processing; the latter may be adapted to be performed, totally or partially, at a remote location, e.g. at server SP, with the consequent possibility of using even rather powerful software tools.

In one or more embodiments, the availability of such information on the audio and/or video program broadcast in ambient A may be used in order to drive the retrieval of the lighting sequence to be performed by sources 1, 2, . . . , n.

This may be the case e.g. if, for a given audio and/or video program, the repository of server SP offers several different lighting sequences.

In this case, in addition or in alternative to the selection by the final user (which can be expressed e.g. via remote controller RC), in one or more embodiments there may be present an automatic selection implemented in server SP, optionally on the basis of the previously collected information about e.g. the habits or the preferences of the end user.

In one or more embodiments (highlighting again the merely functional purpose of the distinction operated herein of controller LC, server SP and remote controller RC), both controller LC and remote controller RC may be used, at least partially, to store the repository of the Data Packages, e.g. if the connection to server SP is not available at the moment.

In one or more embodiments, a user input data set (e.g. parameters defined by the user such as e.g. the data concerning a certain media event, the names of given events, programming codes of live or recorded TV shows or sport events, or film titles, music titles, contents of playlists offered e.g. by an external service provider) may be loaded, optionally directly, into server SP while being associated with the Data Packages stored therein. Server SP, therefore, is adapted to determine lighting sequences e.g. on the basis of a further set of user input data (i.e. a specific lighting arrangement) so as to receive "tagged" Data Packages (both time-tagged and event-tagged) from server SP, which may control and operate in due time e.g. a set of lighting components (i.e. lighting sources 1, 2, . . . , n).

In one or more embodiments, the operating parameter(s) of lighting sources 1, 2, . . . , n may comprise e.g. brightness and colours, the consequent possibility being given of adjusting the lighting colour and brightness e.g. to take into account possible preferences or needs of the end user, e.g. to take into account the mesopic/scotopic sensitivity of the human eyes (and the differences in children and adults), the additional possibility being given of considering daltonism and sight disturbances of various nature.

As regards so-called "special effects", the controllable operating parameters may comprise parameters for underwater lighting effects or for light fountain effects, e.g. the possibility being given of regulating different colour shades to take into account and/or reproduce the absorbing effect of water.

As for the geometric parameters (such as the orientation of the light sources), optionally in combination with the selective control of parameters such as brightness, it is possible to take into account for example geometric factors (e.g. height or size) of ambient A.

It will be appreciated, moreover, that in one or more embodiments the functional connection towards light radiation sources 1, 2, . . . , n does not necessarily require a physical connection, as it may be implemented as wireless, DMX or other methods.

As previously stated, programming codes (optionally encrypted) may be stored in sources 1, 2, . . . , n, in such a way as as to enable a selective control by entitled users.

A further possibility consists in using software code (e.g. an application or "App" for mobile phone, or TV, or web) on the local controller LC for selecting music (audio data, optionally associated with video data) from a distributor acting as a source, the data sequence being received together with the lighting sequence. The application may synchronize the data sets by sending them, e.g. via a local area network (LAN) (multicast and/or broadcast, for example) to connected devices, such as a TV set, an audio system, and the group of lighting sources 1, 2, . . . , n. A partial/total buffer may compensate for the delay and/or the slowness of the network.

One or more embodiments may adopt particular modes of encoding/decoding the data set of the lighting sequences.

For example, the data set may be encoded and loaded into server SP after or while programming a sequence, or at least at the end thereof.

For example, again, a data set coupled with a given selected lighting sequence may be decoded by the end user through a decoding algorithm, which may be:
  either embedded in the lighting source(s),
  or embedded in one or more additional hardware devices, outside the sources, which decode the sequences and send them to the sources.

In one or more embodiments, the sources may be addressed individually by the decoder, either directly or by having the decoder address a source acting as a master, which subsequently transfers the sequence(s) to the other sources, acting as slaves.

It will be appreciated that various aspects of the solution may be transferred from one to another of the examples shown in FIGS. 1 to 4.

For example, in an arrangement as exemplified in FIG. 1, local controller LC may include a simple mobile phone with a given application (APP) installed therein.

In one or more embodiments, in order to achieve a protection against various intrusions (e.g. from competitors), the lighting sequences may be encoded with a protective encryption in server SP, a hardware decoder may be used (optionally a physical device embedded in a master source, which subsequently transfers the related information to the slave sources).

One or more embodiments may therefore envisage:
  coupling respective audio and/or video data to the data files (Data Packages), and/or
  applying protective encoding to said data files, and/or
  coupling said data files to respective audio and/or video data, by applying protective coding to said files and to the respective audio and/or video data associated thereto.

In the case of videogames, the entitlement to creating the lighting sequences may be restricted to the game designers only, by enabling e.g. the calibration of the lighting arrangement via console, the sequences being stored in a repository at a server of the videogame publisher.

One or more embodiments, as described in the foregoing, may envisage the so-called streaming of pre-programmed stored data (from a data repository) together with media files (audio, video), and inputting it into a controller that operates/controls auxiliary lighting fixtures, so as to generate lighting effects which enhance the experience of the viewer/customer.

The lighting fixtures may employ e.g. LED sources, which may be arranged according to RGB or RGBW patterns, and/or a combination of various sources (halogen lamps, discharge lamps, LEDs, laser diodes, Laser Activated Remote Phosphor—LARP, etc.)

One or more embodiments as previously described may envisage the following operation:
  the lighting designer programs lighting sequences for effect lighting luminaries, which are adapted to enhance the video/audio content consumed by the user, such as movies, various shows, music, computer games etc. This may take place according to lighting programs which are recognized as standard in the lighting industry (e.g. effect lighting for shows, musical performances, etc.);

the lighting programs are stored into a data repository, e.g. at media providers and/or media distributors;

if the users want e.g. to stream music, from sources such as e.g. Spotify™ or Tidal™, and/or watch movies from sources such as e.g. Netflix™ they may also receive the pre-programmed fixture lighting sequences streamed, with the possibility of applying them (e.g. by means of their home WLAN, Wi-Fi, Bluetooth™) to a specific lighting fixture. The pre-programmed lighting sequences are time encoded, and may be synchronized with the audio/video content (e.g. video/music) and cooperate with the external lighting fixtures.

One or more embodiments may envisage providing lighting effect programs and/or activation codes for light radiation sources (including displays) adapted to be distributed to the users, e.g. to the gamers, along with media files including programs and data for on-line games, so as to implement lighting sequences with low ambient lighting levels.

Various patent documents, such as U.S. Pat. Nos. 9,011,247 B2, 9,220,158 B2, 8,878,991 B2, generally deal with auxiliary lighting effects based on pre-programmed illumination identifiers.

Other documents representing the prior art include, for example:

U.S. Pat. No. 4,141,002 A1, dealing with the brightness adjustment of a display, in order to achieve the adaptation of an observer's eye as a function of the darkness level, U.S. Pat. No. 8,068,125 B2, which again illustrates the brightness adjustment of a screen as a function of darkness, US 2010/277452 A1, wherein the brightness level determines a gamma correction of the brightness of a display, EP 2 492 905 A1, which shows the possibility of controlling the brightness level of a display in a mobile electronic device depending on the ambient light, WO 2009/147595 A2, which shows the determination of an ambient lighting level signal by means of a screen area colour measurement, with the activation of lighting sources, US 2010/277452 A1, which describes how to gamma-correct video streams or displays.

However, the prior art does not envisage solutions concerning the distribution of lighting program codes or lighting activation codes in the context of playing video games (on PCs, smartphones, tablets, TVs) in sync with game contents, game progress, scores etc. as well as in sync with other media file.

Taking into account the typical lighting settings while playing games (e.g. reduced lighting for a better eye comfort), the distributed lighting programs may be adapted to this (local) condition. This may be achieved effectively by using certain input data (e.g. video screen data, ambient lighting level, etc.) in order to make the desired adjustments.

As stated in the foregoing, it is moreover possible to adjust the operating parameters of lighting sources 1, 2, . . . , n of FIGS. 1 to 4, e.g. by adjusting the brightness and the colours thereof, with the subsequent possibility of adjusting the lighting colour or intensity e.g. in order to comply with possible desires or needs of the final user. For example, it is possible to take into account the mesopic/scotopic sensitivity of the human eye (also distinguishing between children and adults), optionally with reference to possible cases of colour blindness or visual disturbances of various nature.

As explained in the foregoing, one or more embodiments may envisage the generation of an "ambient" audio/video signal, obtained e.g. via a microphone associated with a remote control, denoted as RC in the Figures, or via a direct connection e.g. with the (TV) device denoted as E. Said "ambient" audio and/or video signal may be employed either directly or after an optional processing, which may be implemented remotely, in part or totally, e.g. at server SP, the possibility being therefore given to use even quite powerful software tools.

In a substantially similar way, in one or more embodiments devices such as RC and/or E may enable the detection of a signal indicative of the lighting level of ambient A.

Such an ambient lighting level signal may also be obtained by means of independent light sensor (such as so-called "twilight sensors").

One or more embodiments, however, may take advantage of the fact that various mobile devices, such as smartphones, denoted as RC in the Figure, may already contain a sensor S which (also) acts as a light sensor, e.g. in order to automatically adjust the display brightness level as a function of ambient lighting.

One or more embodiments may take into account the fact that certain users may, for example, watch movies or videos or play computer games at reduced ambient lighting.

This may be particularly true for gamers.

In such a low-lighting environment, the eye sensitivity may shift from a daylight sensitivity to a twilight/night sensitivity. In practice, this entails a passage from photopic to scotopic sensitivity, respectively given by cone receptors and rod receptors in the eye, according to the lighting level.

It is generally known that low lighting levels and high lighting levels respectively correspond to a scotopic vision and to a photopic vision, comprising therebetween a mesopic vision. The scotopic and the mesopic visions essentially depend on the rod receptors, while cone receptors are responsible for mesopic and photopic vision.

As previously stated, in one or more embodiments the detection of the ambient lighting level may be performed by a distinct photo-sensor or, referring to the example shown in FIG. 3, by an ambient lighting sensor S associated e.g. to a smartphone (e.g., the same smartphone that also acts as a remote control RC).

The possibility is therefore given of acting on the light radiation sources 1, 2, . . . , n (e.g. via the members controlling such lighting sources: in this respect, see the various system arrangements and architectures previously discussed with reference to FIGS. 1 to 4) so as to enable an automatic adjustment of the brightness emitted by one or more light radiation sources 1, 2, . . . , n as a function of the detected ambient lighting level, e.g. by means of a sensor such as sensor S.

One or more embodiments may deal with the intrinsic difficulty, for a lighting sequence programmer, to provide a range of data sets which differ depending on the lighting level of the environment.

One or more embodiments, therefore, may apply the general criterion of acting on the lighting sequences when they are included e.g. in a data stream, e.g. by means of a controller/software, so as to detect the current ambient lighting level and automatically re-program the lighting sources according to specified conditions (e.g. by means of separate programs).

Consequently, lighting sources 1, 2, ..., n may receive a modified control signal, which adjusts brightness and/or colour values.

In one or more embodiments, for example, information may be provided in order to achieve a corrected brightness level, on the basis of one or more light sensors located outside lighting sources 1, 2, ..., n. This may be achieved, in one or more embodiments, by means of a sensor denoted as S in FIG. 3, associated to a mobile terminal (e.g. a smartphone, which may also be used as a remote control RC according to the criteria discussed in the foregoing).

In one or more embodiments, therefore, it is possible to act (e.g. via module LC) on the brightness level of one or more light radiation sources 1, 2, ..., n with a gamma correction; i.e., each colour level is e.g. PWM dimmed (according to a procedure known in itself).

In addition or as an alternative, the colour values of one or more sources 1, 2, ..., n may be corrected e.g. by taking into account the eye absorption curves.

In one or more embodiments, the input signal concerning the lighting level (and consequently the colour setting of the light radiation sources) may be obtained by means of an analysis of a screen display, as described in document WO 2009/147595 A2, already mentioned in the foregoing.

In one or more embodiments, when shifting from one brightness level to another, e.g. from a higher to a lower lighting level, the amount of green and red light may be enhanced, e.g. for an RGB light source, in order to approximately maintain the previous colour point (e.g. with reference to the colour coordinates according to the CIE 1931 chromaticity diagram).

In one or more embodiments, the red and green contents of the radiation from such a source may be dimmed while enhancing the blue content, in the case of lower ambient lighting conditions.

In this way, the final user may select among a variety of methods of adapting to a lower ambient lighting (in practice, of adapting to darkness).

As previously stated, said regulating functions may be implemented via a PWM dimming functions (as known in itself).

One or more embodiments may therefore concern a method of controlling lighting sources (e.g. 1, 2, ..., n), said lighting sources having at least one operating parameter which is controllable in at least one lighting sequence as a function of a time code data set coupled with said sequence, the method including:
  providing a repository (e.g. SP) of operating data files for the lighting sources, said operating data files being coupled with said lighting sources, with each data file including at least one time code data set for at least one lighting sequence for a respective one among said lighting sources,
  retrieving in said data repository at least one operating data file coupled with a selected one of said lighting sources,
  detecting (e.g. S, E) at least one ambient lighting level signal at the ambient (e.g. A) where said lighting sources are located, and
  operating said selected lighting source by controlling (LC) said at least one operating parameter as a function of the operating data included in the operating data file retrieved and as a function of said at least one ambient (A) lighting level signal.

As previously stated, in one or more embodiments, the detection of at least one ambient (e.g. A) lighting level signal may be accompanied by an analysis (e.g. on a graphics card) of the colour and brightness values appearing on a display (e.g. RC, E).

In one or more embodiments, said at least one operating parameter may include the brightness of said selected lighting source.

One or more embodiments may include controlling said brightness by PWM controlling at least one chromatic component of the light emitted from said selected lighting source.

One or more embodiments may include controlling said at least one operating parameter as a function of said ambient (A) lighting level according to eye absorption curves.

One or more embodiments may include detecting said ambient (A) lighting level signal (A) by analysing a display screen (RC, E).

One or more embodiments may include controlling said at least one operating parameter as a function of said at least one ambient (A) lighting level signal, by maintaining the colour point of the light emitted by said selected lighting source substantially constant.

In one or more embodiments, said selected lighting source may include an RGB lighting source, and the method may include controlling the brightness of said RGB source by dimming the red and green contents and by enhancing the blue content at lower lighting conditions.

In one or more embodiments, a lighting system may include:
  at least one lighting source having at least one operating parameter which is controllable in at least one lighting sequence as a function of a time code data set coupled with said sequence,
  a repository of operating data files for lighting sources, said operating data files being coupled with a plurality of lighting sources, with each data file including at least one time code data set for at least one lighting sequence for a respective one of said lighting sources,
  at least one sensor for detecting at least one ambient lighting level signal at the ambient where said lighting sources are located, and
  control means configured for:
  retrieving in said repository at least one operating data file coupled with a selected lighting source, and
  operating said selected lighting source by controlling said at least one operating parameter as a function of the operating data included in the operating data file retrieved and as a function of said at least one ambient lighting level signal, the system being configured for operating by means of the method according to one or more embodiments of the claims.

One or more embodiments may concern a computer program product, loadable in the memory of at least one computer and including software code portions for performing the method according to one or more embodiments.

Without prejudice to the basic principles, the implementation details and the embodiments may vary, even appreciably, with respect to what has been described herein by way of non-limiting example only, without departing from the extent of protection.

The extent of protection is defined by the annexed claims.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A method of controlling lighting sources, said lighting sources having at least one operating parameter which is controllable in at least one lighting sequence as a function of a time code data set coupled therewith, the method comprising:
providing a repository of operating data files for said lighting sources, said operating data files coupled with said lighting sources with each data file including at least one time code data set for at least one lighting sequence for a respective one of said lighting sources,
retrieving in said repository at least one operating data file coupled with a selected one of said lighting sources,
detecting at least one ambient lighting level signal at the ambient of said lighting sources, and
operating said selected one of said lighting sources by controlling said at least one operating parameter as a function of the operating data included in the operating data file retrieved and as a function of said ambient lighting level signal.

2. The method of claim 1, wherein said at least one operating parameter includes the brightness of said selected one of said lighting sources.

3. The method of claim 2, further comprising controlling said brightness by PWM controlling at least one chromatic component of the light emitted from said selected one of said lighting sources.

4. The method of claim 1, further comprising controlling said at least one operating parameter as a function of said ambient lighting level according to eye absorption curves.

5. The method of claim 1, further comprising detecting said ambient lighting level signal by analyzing of a display of a display screen.

6. The method of claim 1, further comprising controlling said at least one operating parameter as a function of said ambient lighting signal by maintaining the colour point of the said selected one of said lighting sources substantially constant.

7. The method of claim 1, wherein said selected one of said lighting sources in includes an RGB lighting source, herein the method includes controlling the brightness of said RGB lighting source by dimming the red and green contents and enhancing the blue content at lower lighting conditions.

8. A lighting system, comprising:
at least one lighting source having at least one operating parameter which is controllable in at least one lighting sequence as a function of a time code data set coupled therewith,
a repository of operating data files for lighting sources, said operating data files coupled with a plurality of lighting sources with each data file including at least one time code data set for at least one lighting sequence for a respective one of said lighting sources,
at least one sensor for detecting at least one ambient lighting level signal at the ambient of said lighting sources, and
control means configured for:
retrieving in said repository at least one operating data file coupled with a selected one of said lighting sources,
operating said selected lighting source by controlling said at least one operating parameter as a function of the operating data included in the operating data file retrieved and as a function of said ambient lighting level signal, the system configured for operating according to a method of controlling lighting sources.

9. A non-transitory computer readable medium comprising instructions which when executed by a computer and comprising software code portions for performing a method of controlling lighting sources, said lighting sources having at least one operating parameter which is controllable in at least one lighting sequence as a function of a time code data set coupled therewith, wherein the method comprises:
providing a repository of operating data files for said lighting sources, said operating data files coupled with said lighting sources with each data file including at least one time code data set for at least one lighting sequence for a respective one of said lighting sources,
retrieving in said repository at least one operating data file coupled with a selected one of said lighting sources,
detecting at least one ambient lighting level signal at the ambient of said lighting sources, and
operating said selected one of said lighting sources by controlling said at least one operating parameter as a function of the operating data included in the operating data file retrieved and as a function of said ambient lighting level signal.

* * * * *